United States Patent [19]
Alet et al.

[11] Patent Number: 5,018,973
[45] Date of Patent: May 28, 1991

[54] MOTION SIMULATOR FOR VEHICLE DRIVER

[75] Inventors: Robert Alet, Cergy; Roland Jezequel, Orgeval, both of France

[73] Assignee: Thomson-CSF, Puteaux, France

[21] Appl. No.: 441,268

[22] Filed: Nov. 27, 1989

[30] Foreign Application Priority Data

Nov. 30, 1988 [FR] France .................. 88 15665

[51] Int. Cl.⁵ .............................................. G09B 9/04
[52] U.S. Cl. ........................................ 434/62; 434/58; 434/55; 434/29; 272/16; 272/18
[58] Field of Search ............... 434/62, 63, 64, 67, 434/68, 69, 37, 43, 45, 29, 33, 55, 58; 272/16–18, 28 R, 28 S, 29, 31 A, 31 B, 36, 38, 49, 50

[56] References Cited

U.S. PATENT DOCUMENTS

| Re. 27,051 | 2/1971 | Cappel | 434/58 |
|---|---|---|---|
| 3,577,655 | 5/1971 | Pancoe | 434/58 |
| 3,818,613 | 6/1974 | Julian et al. | 434/33 |
| 4,066,256 | 1/1978 | Trumbull | 272/18 |
| 4,343,610 | 8/1982 | Chou | 434/58 |
| 4,461,470 | 7/1984 | Astroth et al. | 434/43 |
| 4,496,323 | 1/1985 | Alet et al. | |
| 4,576,577 | 3/1986 | Lam et al. | 434/58 |
| 4,650,420 | 3/1987 | Alet et al. | |
| 4,751,662 | 6/1988 | Croshie | 434/55 |
| 4,753,596 | 6/1988 | Hart et al. | 434/29 |
| 4,812,000 | 3/1989 | Rouille et al. | |

Primary Examiner—Richard J. Apley
Assistant Examiner—Glenn Richman
Attorney, Agent, or Firm—Oblon, Spivak, McClelland, Maier & Neustadt

[57] ABSTRACT

A motion simulator for vehicle driver training, which includes at least three actuators placed at the vertices of a triangle, connected to at least three connecting points, arranged in a triangle, for the fastening of a platform of a cabin by lever arms, one end of each of these arms being connected to a corresponding actuator by a joint with two degrees of freedom, the other end of one of the lever arms being connected to a point for fastening the platform by the joint with two degrees of freedom, and the other end of the other lever arms being connected, at all times, to one of the other platform fastening points by a joint with at least four degrees of freedom.

7 Claims, 4 Drawing Sheets

MOTION SIMULATOR FOR VEHICLE DRIVER

BACKGROUND OF THE INVENTION

1. Field of the Invention

The present invention pertains to a motion simulator for training persons to drive a vehicle, more particularly a tank.

2. Description of the Prior Art

The cabins of present-day simulators are mounted on platforms driven by hydraulic jacks, enabling the application to them mainly of rotations along three axes: roll, pitch and yaw.

The accelerations and angular deflections are identical to those encountered during the movements of tanks in the field.

Nevertheless it would appear that the training of a trainee does not always require the absolute values of the simulation parameters to be all reproduced with exactness.

Certain parts of the human body record the accelerations that it undergoes like accelerometer sensors. The pieces of information are processed by the brain and analyzed. After analysis, the brain may tranmit a result in raw form ("I am being subjected to a left-to-right force") and/or order the muscles concerned so as to return to the original position.

This sensor (comprising elements of the inner ear and of the vertebral column) is "pre-stressed" by the earth's field of gravity: referential g. It is calibrated by the brain, through the memorizing of all prior situations experienced (body growth, weight, experience, cause and effect relationships, sight/attitude etc). As with any calibration, there is a zero reference. It is obtained when the axis of the vertebral column is colinear with g.

The notions of: "front/rear", "left/right" are related to the axes of the body: vertebral column→head and axis of sight.

By contrast, the notion of up and down is related more to the axis of the vector of the gravitational field than to the axis of the vertebral column. In a normal position, on the earth, "up" is equivalent to the "head", and "down" to the "feet". In zero gravity, this notion no longer has any meaning.

In conclusion, the human body undergoes accelerations in relative value, in general, and hence variations in attitude through a gravitational field, in particular. The brain makes an analysis and deduces the direction, it's value (positive or negative) and the variation in intensity therefrom. However, it cannot give an absolute value. It is here that simulation comes into play.

To avoid the oversizing of the components of the simulator, we are led to make an analysis of the function f=pedagogical value of the simulator/realism (see FIG. 1).

It is taken to be the case that normal driving, on the road or in all-terrain conditions for which the tank has been designed, represents 95% of all cases. The remaining 5% of the cases which would lead to perfect realism (collision, overturning, etc) are exceptional and would contribute no pedagogical value.

For example, in the above-mentioned 5% of cases, a possible configuration for a real tank would involve climbing a 30 degrees slope.

In the context of simulation, a tilt of the cabin of about 13 degrees is enough to give the driver the direction and value (positive or negative) of the tilt. As his brain does not have all the elements to determine the absolute value of the slope, it makes use of the other senses:

(a) sight: the image presented to him really forms an angle of 30 degrees with the horizontal;

(b) hearing: the noise of the engine is directly related to the angle of the slope, in this case 30 degrees;

(c) his memory: depending on prior experience

The brain is therefore deceived by the references that are very realistically imposed on it by the effects a, b and c, and the attitude of the body confirms the analysis made by the brain, simply by the the direction and its value (positive or negative).

These background points lead us to define a motion simulator that is simpler, more compact and less costly, and has performance characteristics that are optimized during use.

Presently existing high-performance hydraulic systems are used up to only 50% of their capacities in 95% of the simulation time and make it necessary to have an adapted infrastructure (reinforced concrete base, substantial floor-to-ceiling height, hydraulic power unit with sound isolation of the premises etc.).

The hydraulic systems require relatively specialized maintenance staff, the overall energy efficiency is low and requires refrigeration of the oil, and most of the components are relatively costly.

In conclusion, even by reducing the performance characteristics of present-day hydraulic systems, the cost reduction is not appreciable.

SUMMARY OF THE INVENTION

An object of the invention is a compact and easy-to-use motion simulator requiring no specialized staff for its maintenance and having performance characteristics that are sufficient for the simulation for which it is designed.

The simulator according to the invention has at least three actuators placed at the vertices of a substantially equilateral triangle, connected to at least three corresponding points for the fastening of the platform of the cabin by lever arms, one of the ends of each of these arms being connected to the corresponding actuator by a connecting rod/crank assembly, the other end of one of the lever arms being connected to a point for fastening the platform by a joint with two degrees of freedom, and the other end of the other lever arms being connected, every time, to one of the other platform fastening points by a joint with at least four degrees of freedom.

Preferably, the actuators are electrical.

According to an advantageous embodiment of the invention, the actuators are connected to the joints of the lever arms by connecting rods and cranks restricting the deflection of the lever arms. This makes it possible to avoid the use of safety systems such as stops and limit-of-travel detectors.

BRIEF DESCRIPTION OF THE DRAWINGS

The present invention will be understood more clearly from the detailed description of an embodiment, taken as a non-restrictive example, and illustrated by the appended drawings, wherein.

DESCRIPTION OF A PREFERRED EMBODIMENT

The simulator cabin motion device described below is designed to communicate motions to a cabin of a vehicle (for example a tank) simulator. The degree of these motions, as explained in the introduction, is not as great as in reality but, in most cases, makes for satisfactory realism and gives the simulation good pedagogical value.

The cabin of the simulator, as well as its control system, do not form part of the invention and have therefore not been shown. It is enough to know that this cabin is a body with an interior that is as faithful a reproduction as possible of the interior of the simulated vehicle, fixed on a polygonal platform.

Figure 1:
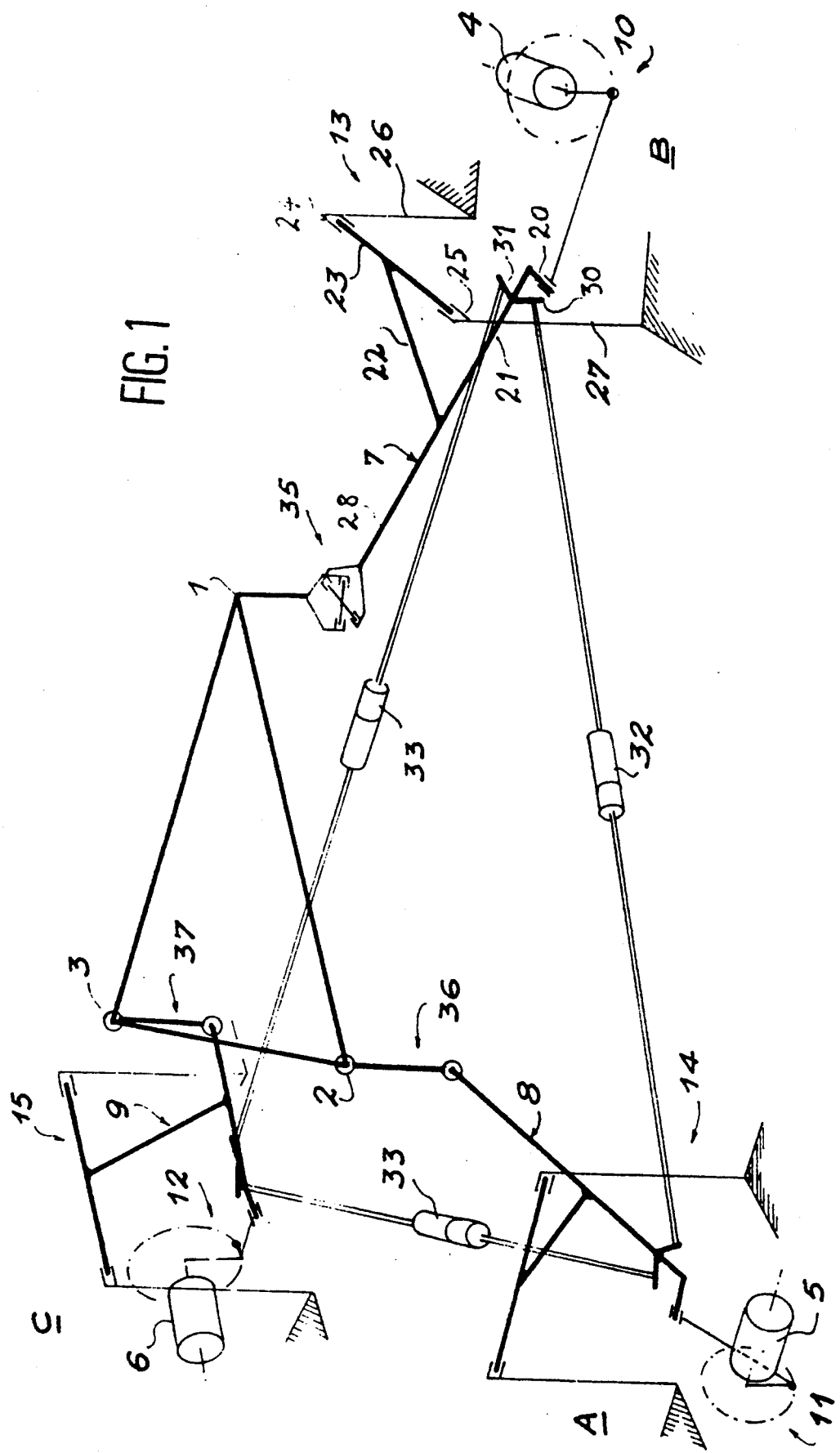
FIG. 1 is a schematic view in perspective of the simulator cabin actuating device according to the invention.
Figure 2:
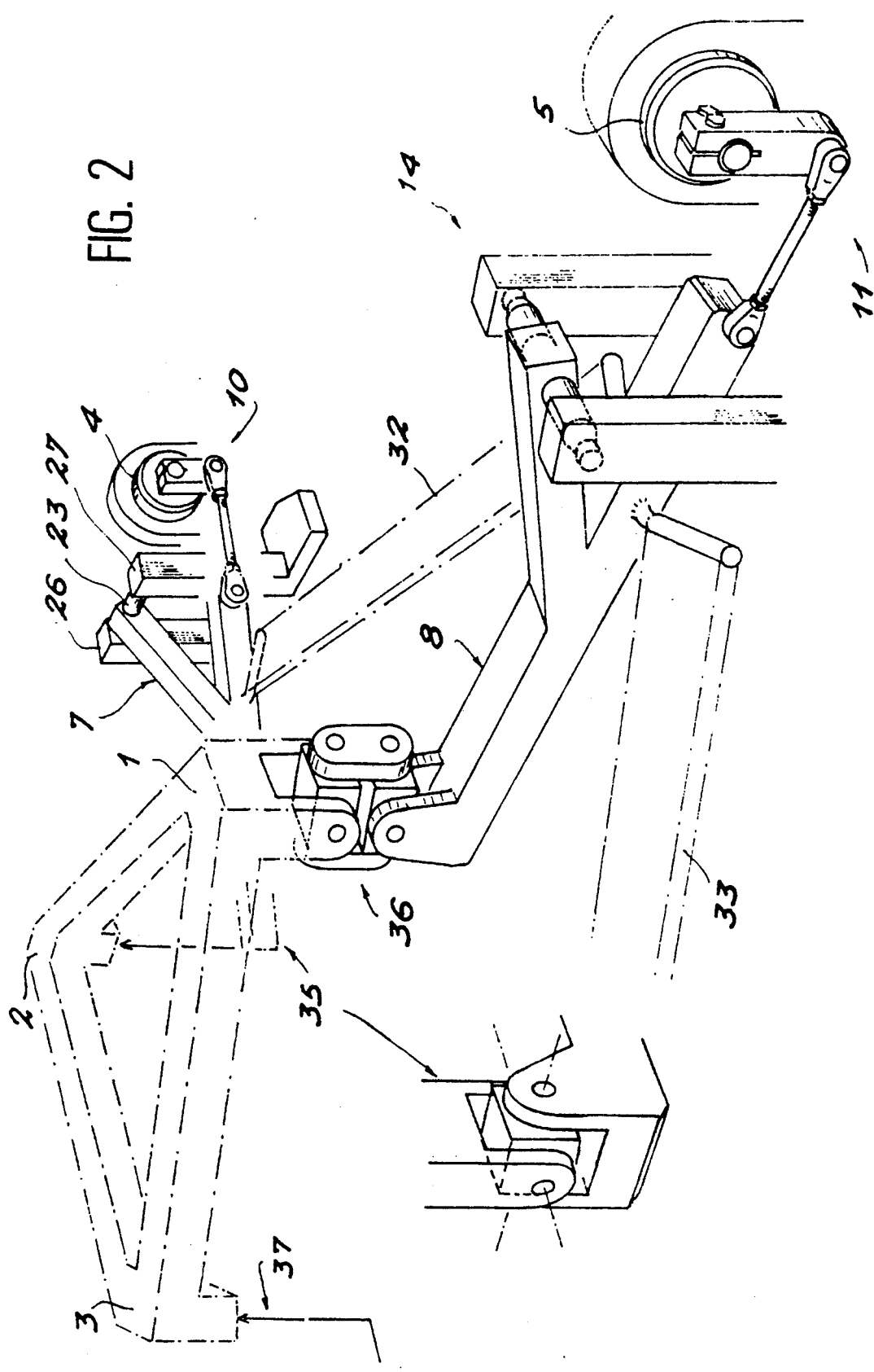
FIG. 2 is a simplified view in perspective of the lever arms of the device according to FIG. 1.

The cabin motion device is fixed to the lower face of said platform at three points 1, 2, 3 (FIG. 1) arranged at the vertices of a substantially equilateral triangle, the center of which coincides as far as possible with the center of gravity of the platform fitted out with the cabin: this is in order to provide proper balancing.

The cabin motion device is moved by three actuators 4, 5, 6 connected to the three points 1, 2, 3 by hinged links respectively referenced 7, 8, 9. The actuators 4 to 6 are, preferably, electrical motors.

Figure 3:
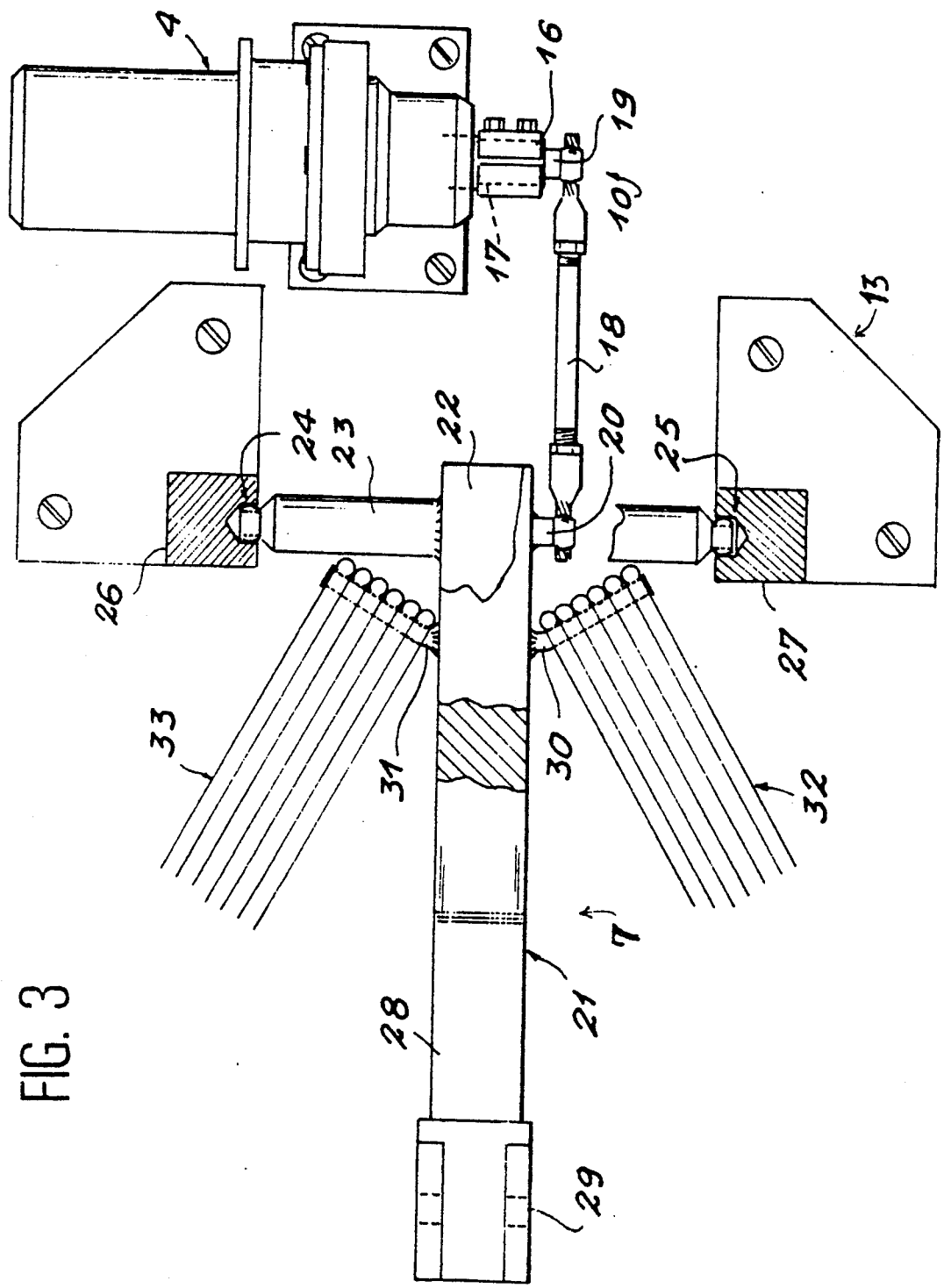
FIG. 3 is a top view, in detail, of one of the actuators of the device of FIG. 1 and of the corresponding joint.

Each actuator 4 to 6 drives the corresponding lever arm by means of a connecting rod/crank assembly, respectively referenced 10 to 12 in its entirety. This connecting rod/crank assembly is connected to a "jumping-jack" type of joint, respectively referenced 13 to 15 in its entirety. Since these connecting rod/crank assemblies and joints are all identical, only one of them shall be described in detail: this being the connecting rod/crank assembly 10 and the joint 13, relating to the motor 4, with reference to FIGS. 3 and 4.

The crank 16 of the assembly 10 is fixed to the shaft 17 of the motor 4. A rod 18 is mounted so as to be free in rotation on a crank pin 19, fixed to the end of the crank 16 in parallel with the shaft 17. At its other end, the rod 18 is mounted so as to be free in rotation on a shaft 20 fixed to the control end of the joint 13.

The joint 13 has a general "Y" shape which is perpendicular to the shaft 17. The end of one of the arms of this "Y", referenced 21, bears the shaft 20. At the end of another arm of the "Y", referenced 22, a shaft 23, going through this arm, is fixed. This shaft 23 is mounted so as to be free in rotation on the bearings 24, 25 supported by fixed brackets 26, 27 respectively. The last arm of the "Y", referenced 28, has its end shaped into a supporting cap 29 for a Cardan joint which is a single Cardan joint for one of the arms, for example the arm 7, and a double Cardan joint for the other two arms, for example the arms 8 and 9.

Figure 4:
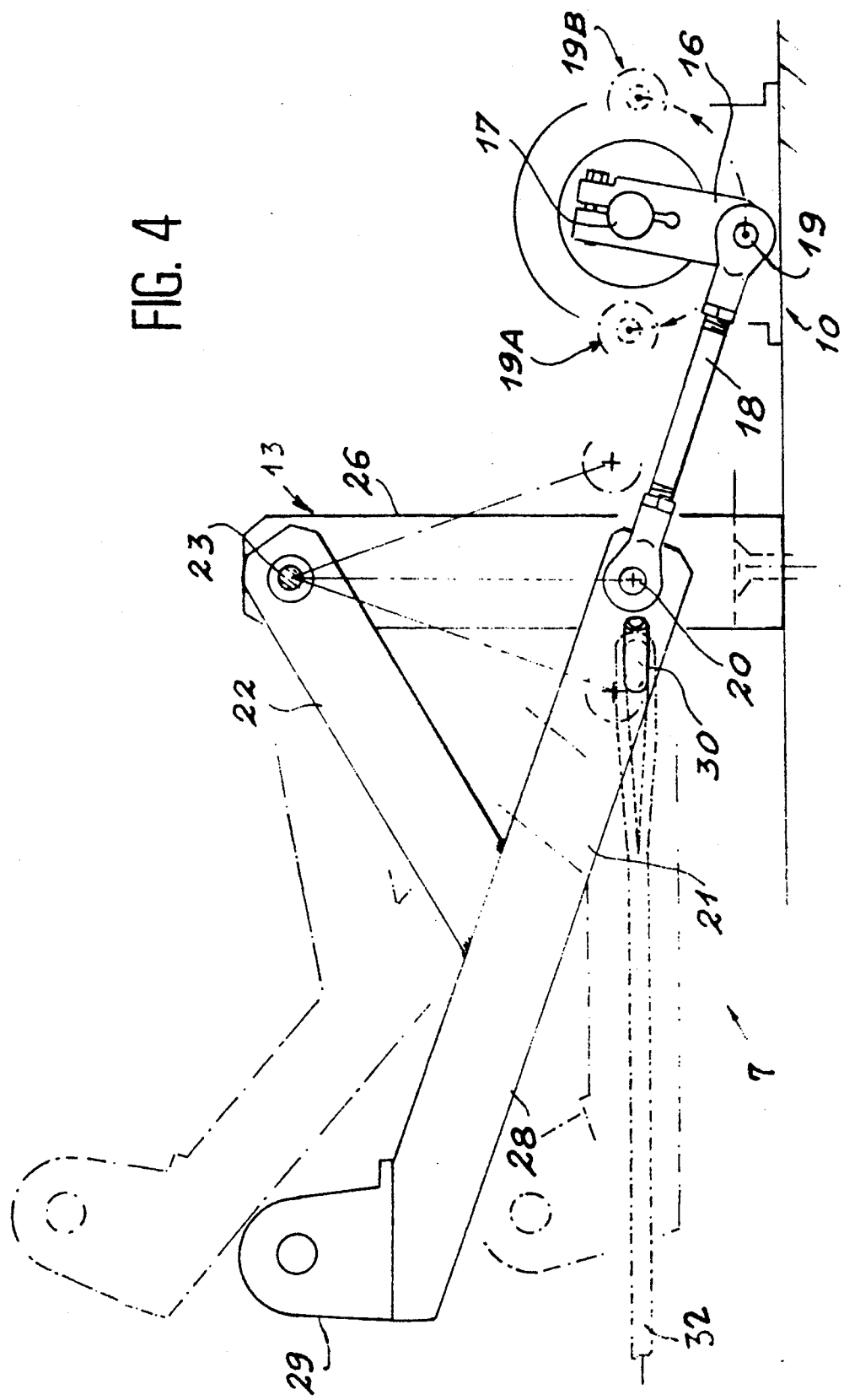
FIG. 4 is a front view, in detail, of an actuator with limiting of the deflection of a lever arm of the device of FIG. 1.

The deflections of the device 13 are limited by the crank 16. In FIG. 4, unbroken lines are used to represent a mean position of the device 13, and lines formed by dots and dashes represent its farthest positions which correspond to substantially diametrically opposite positions of the crank pin 19, referenced 19A and 19B in the drawing.

A balancing device fastening rod is fixed to the arm 21 of the device 13, near the shaft 20, on either side of the arm. These rods are referenced 30, 31 and are placed symmetrically with respect to the arm 21. The device of the invention has three balancing devices 32, 33, 34, respectively connecting the first arms (arm 21 and its homologous arms) of the "Y"s of the links 7-8, 8-9 and 9-7. These balancing devices thus demarcate a substantially equilateral triangle (should the actuators 4, 5, 6 be placed at the vertices of a substantially equilateral triangle). Consequently, it is advantageous for the rods 30, 31 to then form an angle of 120 degrees with each other (60 degrees with respect to the arm 21).

The balancing devices 32 to 34 are devices compensating for the weight of the cabin of the simulator with its platform. In the present case they are, therefore, devices exerting a tensile force on their fastening points. According to the preferred embodiment, shown in the drawing, they are sandows which have the advantage of great stretching capacity for a small variation in force.

The joint 35, connecting the link 7 to the fastening point 1, is of the type having two degrees of freedom, for example a single Cardan joint. The joints 36, 37, respectively connecting the links 8, 9 to the fastening points 2, 3, are of the type having at least four degrees of freedom, for example double Cardan joints.

Since the fastening points 1 to 3 of the cabin platform are arranged in a triangle, the links between the actuators and these fastening points have simple motions and reduced amplitude.

The system as described above and shown in FIG. 1 is called a "carrier" system. This means that the cabin is placed above the joints 35 to 37. Another version, called a suspended version, consists in placing the joints 35 to 37 above the base represented by the triangle 1, 2, 3.

Obviously, numerous modifications and variations of the present invention are possible in light of the above teachings. It is therefore to be understood that within the scope of the appended claims, the invention may be practiced otherwise than as specifically described herein.

What is claimed is:

1. A motion simulator for vehicle driver training, which comprises:
   at least three actuators placed at the vertices of a triangle, connected to at least three corresponding points, arranged in a triangle, for the fastening of a platform of a cabin by lever arms, one end of each of these arms being connected to a corresponding actuator by a joint with two degrees of freedom, the other end of one of the lever arms being connected to a point for fastening the platform by the joint with two degrees of freedom, and the other end of the other lever arms being connected, at all time, to one of the other platform fastening points by a joint with at least four degrees of freedom.

2. A simulator according to claim 1, wherein the triangles are substantially equilateral.

3. A simulator according to claim 1, wherein the actuators comprises electrical motors.

4. A simulator according to claim 1, wherein the actuators are connected to the joints of the lever arms by cranks and connecting rods restricting the deflection of the lever arms.

5. A simulator according to claim 1, wherein the lever arms are "Y"-shaped "jumping jacks".

6. A simulator according to claim 1, wherein the joint with two degrees of freedom, placed on either side of the platform fastening points, is a single Cardan joint.

7. A simulator according to claim 1, wherein the joints with at least four degrees of freedom are double Cardan joints.

* * * * *